(12) United States Patent
Daigo (10) Patent No.: US 11,477,839 B2
(45) Date of Patent: Oct. 18, 2022

(54) IMAGE-CAPTURING DEVICE AND COMMUNICATION METHOD

(71) Applicant: Ricoh Company, Ltd., Tokyo (JP)

(72) Inventor: Kenji Daigo, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 21 days.

(21) Appl. No.: 17/324,322

(22) Filed: May 19, 2021

(65) Prior Publication Data

US 2021/0385898 A1 Dec. 9, 2021

(30) Foreign Application Priority Data

Jun. 4, 2020 (JP) .............................. JP2020-097727

(51) Int. Cl.
*H04W 76/19* (2018.01)
*H04W 76/18* (2018.01)
*H04W 76/27* (2018.01)

(52) U.S. Cl.
CPC ........... *H04W 76/19* (2018.02); *H04W 76/18* (2018.02)

(58) Field of Classification Search
CPC ..... H04W 76/19; H04W 76/18; H04W 76/27; Y02D 30/70
See application file for complete search history.

(56) References Cited

U.S. PATENT DOCUMENTS

2011/0293260 A1 12/2011 Daigo
2012/0300051 A1 11/2012 Daigo et al.
2016/0014550 A1* 1/2016 Chiddarwar ............ H04W 4/80 455/41.2
2017/0111859 A1* 4/2017 Sakai ................ H04W 52/0212
2018/0152840 A1* 5/2018 Nagasaki .............. H04W 12/06
2018/0310248 A1* 10/2018 Nakayama ........ H04W 52/0229

(Continued)

FOREIGN PATENT DOCUMENTS

JP 2007-006023 1/2007
JP 2014-003379 1/2014

(Continued)

*Primary Examiner* — Harry H Kim
(74) *Attorney, Agent, or Firm* — Xsensus LLP (57) ABSTRACT

An image-capturing device includes a low-power communication device to perform first communication processing; the at least one high-speed communication device to perform second communication processing; and circuitry. The circuitry switches between the low-power communication device and the at least one high-speed communication device according to an operation input, to perform the first communication processing or the second communication processing according to the operation. The circuitry, in response to an input of the first operation, controls the low-power communication device to perform the first communication processing based on a connection state of the low-power communication device and the terminal, which has been established before the input of the first operation; and in response to an input of the second operation, controls the at least one high-speed communication device to connect with the terminal and perform the second communication processing based on connection information acquired before the input of the second operation.

8 Claims, 3 Drawing Sheets

(56) References Cited

U.S. PATENT DOCUMENTS

| | | | |
|---|---|---|---|
| 2019/0191074 A1* | 6/2019 | Ikeda | H04W 4/80 |
| 2020/0388905 A1 | 12/2020 | Daigo | |
| 2020/0396579 A1* | 12/2020 | Kallam | H04W 84/20 |
| 2021/0058768 A1* | 2/2021 | Hirose | H04W 76/14 |
| 2021/0105404 A1* | 4/2021 | Tao | H04N 5/23229 |

FOREIGN PATENT DOCUMENTS

| | | |
|---|---|---|
| JP | 2015-180043 | 10/2015 |
| JP | 2017-034390 | 2/2017 |

* cited by examiner

IMAGE-CAPTURING DEVICE AND COMMUNICATION METHOD

CROSS-REFERENCE TO RELATED APPLICATIONS

This patent application is based on and claims priority pursuant to 35 U.S.C. § 119(a) to Japanese Patent Application No. 2020-097727, filed on Jun. 4, 2020 in the Japan Patent Office, the entire disclosure of which is hereby incorporated by reference herein.

BACKGROUND

Technical Field

Embodiments of the present disclosure relate to an image-capturing device having a communication capability and a communication method of communicating between the image-capturing device and a terminal.

Related Art

Digital cameras are wirelessly communicable with a terminal such as a smartphone, can be operated via such a terminal, and is capable of transmitting image data by using dedicated application software. Examples of wireless communication system include near-field communication (NFC), Bluetooth (registered trademark), and wireless local area network (WLAN).

SUMMARY

In an aspect of this disclosure, there is provided an image-capturing device including: a low-power communication device that consumes lower power than at least one high-speed communication device; the at least one high-speed communication device communicable at a higher speed than the low-power communication device; and circuitry. The low-power communication device is configured to perform first communication processing. The at least one high-speed communication device is configured to perform second communication processing. The circuitry is configured to: switch between the low-power communication device and the at least one high-speed communication device according to an operation input to the image-capturing device or an external terminal communicably connectable with the image-capturing device, to perform processing including the first communication processing or the second communication processing according to the operation. The operation includes a first operation, for which the first communication processing is acceptable, or a second operation that involves the second communication processing. The circuitry is configured to: in response to an input of the first operation, control the low-power communication device to perform the first communication processing based on a connection state of the low-power communication device and the external terminal, which has been established before the input of the first operation; and in response to an input of the second operation, control the at least one high-speed communication device to connect with the external terminal and perform the second communication processing based on connection information acquired before the input of the second operation.

In another aspect of this disclosure, there is provided a communication method including switching between a low-power communication device and at least one high-speed communication device according to an operation input to an image-capturing device or an external terminal communicably connectable with the image-capturing device, to perform processing according to the operation, the low-power communication device configured to perform first communication processing and consume lower power than the at least one high-speed communication device, the at least one high-speed communication device configured to perform second communication processing and communicable at a higher speed than the low-power communication device, the processing including the first communication processing or the second communication processing, the operation including a first operation, for which the first communication processing is acceptable, or a second operation that involves the second communication processing. The communication method further includes: in response to an input of the first operation, controlling the low-power communication device to perform the first communication processing based on a connection state of the low-power communication device and the external terminal, which has been established before the input of the first operation; and in response to an input of the second operation, controlling the at least one high-speed communication device to connect with the external terminal and perform the second communication processing based on connection information acquired before the input of the second operation.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The embodiments of the present disclosure enable seamless selection of a communication system suitable for an operation that involves communication processing, without a user's additional operation.

Figure 1:
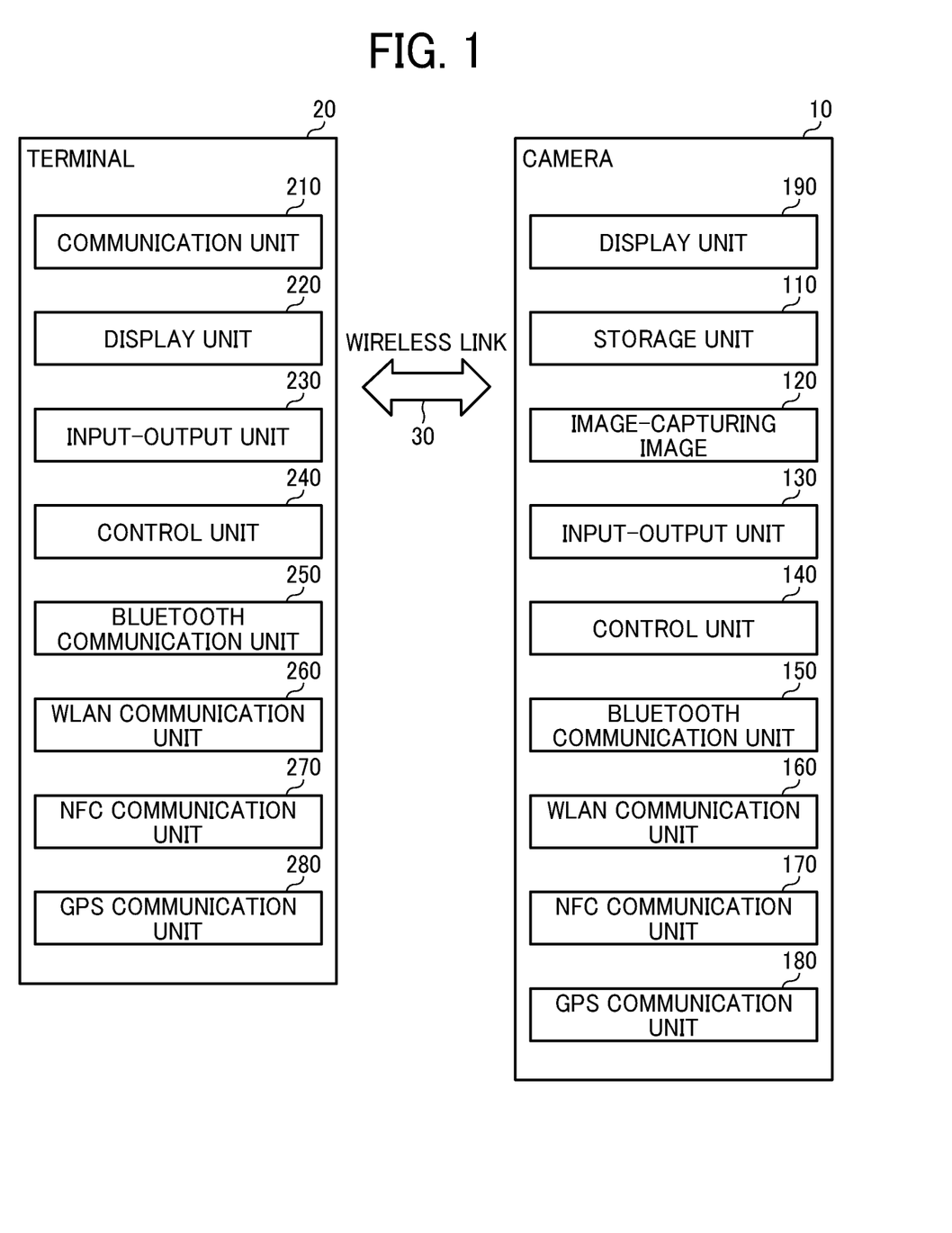
FIG. 1 is a block diagram of a functional configuration of a digital camera according to an embodiment of the present disclosure.

A digital camera, which is hereinafter referred to as a camera, is described according to an embodiment, with reference to the drawings. FIG. 1 is a block diagram of a functional configuration of a digital camera according to an embodiment of the present disclosure.

A camera 10 has a communication capability and is communicable through wireless link 30 and a terminal 20 such as smartphone. The wireless link 30 is, for example, WLAN, Bluetooth (registered trademark), and Bluetooth Low Energy (BLE).

The camera 10 includes a storage unit 110, an image-capturing unit 120, an input-output unit 130, a control unit 140, a Bluetooth communication unit 150, a WLAN communication unit 160, an NFC communication unit 170, and a global positioning system (GPS) communication unit 180. In response to an operation on a release button provided on the main body of the camera 10, an image-capturing sequence process is executed by the image-capturing unit 120, and the image data is recorded in the storage unit 110. Further, the recorded image data can be transferred from the camera 10 to the terminal 20 through an operation on a selection-execution button provided on the main body of the camera 10.

The terminal 20 includes a communication unit 210 for telephones conforming to wireless communication standards such as 4G and 5G, a display unit 220, an input-output unit 230, a control unit 240, a Bluetooth communication unit 250, a WLAN communication unit 260, an NFC communication unit 270, and a GPS communication unit 280. The dedicated application software incorporated into the camera 10 allows various operations on the camera 10 side via operation members such as a shutter button and the selection-execution button, to be remotely controlled from the terminal 20 side.

The Bluetooth communication unit 150 is capable of performing communication processing in accordance with a wireless communication standard of Bluetooth basic rate (BR)/enhanced data rate (EDR)/high speed (HS), which are to be referred to simply as Bluetooth, or Bluetooth low energy (BLE). BLE consumes much less power than other wireless communication standards and has a lower communication speed than the Bluetooth wireless communication standard. The WLAN communication unit 160 can perform communication processing in accordance with communication standards, such as wireless local area network (WLAN) 2.4 GHz and WLAN 5 GHz, and communicates with an external device having WLAN capability. The WLAN communication unit 160 is capable of high-speed communication, which is higher than the communication processing by the Bluetooth communication unit 150.

The NFC communication unit 170 performs communication processing in accordance with the NFC standard and is communicable with an external device having reader-writer capability. The GPS communication unit 180 is capable of receiving a GPS signal from a GPS satellite, and acquires position information and time information for a still image or a moving image to be recorded, before recording image data in association with its position information and time information. The GPS communication unit 180 is also capable of transmitting position information of the camera body to outside of the camera. GPS is used as a global navigation satellite system (GNSS). Alternatively, another positioning satellite system, such as Galileo, BeiDou, or Michibiki, may be used. For the camera 10 without the GPS capability, the terminal 20 receives position information using its GPS capability, and attaches the position information to a still image or a moving image to be recorded. The Bluetooth communication unit 250, WLAN communication unit 260, NFC communication unit 270, and GPS communication unit 280 of the terminal 20 are the same as the Bluetooth communication unit 150, WLAN communication unit 160, NFC communication unit 170, and GPS communication unit 180 of the camera 10, respectively.

When initialized, the camera 10 according to the present embodiment continuously maintains its communication connection with the terminal 20 in accordance with the BLE wireless communication standard, which consumes the least power. In response to an operation for any process involving communication processing between the camera 10 and the terminal 20, the communication processing is performed in accordance with the BLE wireless communication standard within the permissible range of the BLE wireless communication speed, and the communication processing is performed in accordance with a wireless communication standard such as the Bluetooth or the WLAN whose communication speed is higher than the BLE wireless communication standard when such a higher-speed communication is used. These communication controls are performed by the control unit 140. The following describes the communication control.

Figure 2:
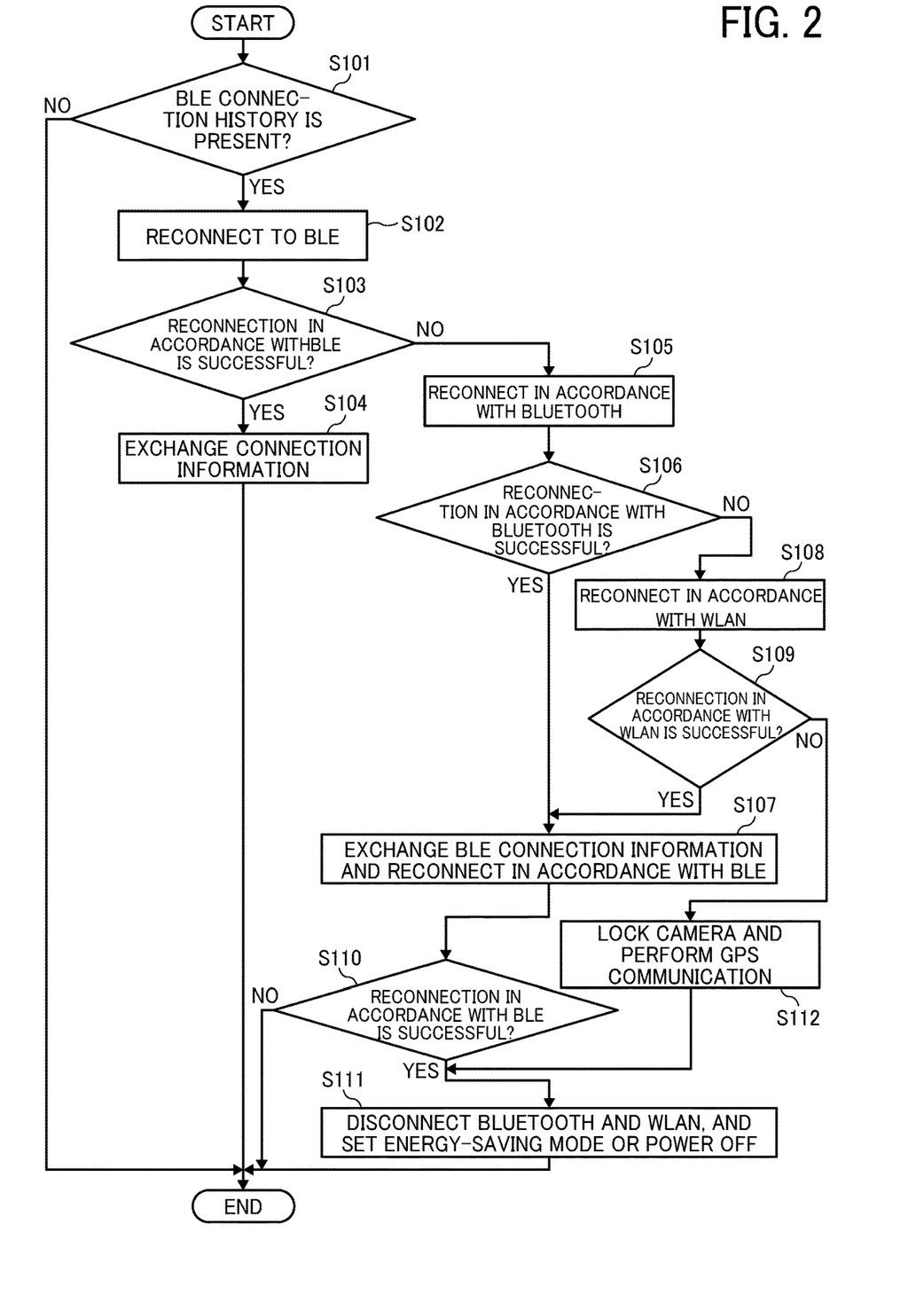
FIG. 2 is a flowchart of communication connection processing when the camera starts up.

FIG. 2 is a flowchart of a communications connection processing, which is performed by the control unit 140 when the camera 10 starts up.

First, a user is prompted to establish a communication connection between the camera 10 and the terminal 20 in accordance with the BLE wireless communication standard, which is the initial setting. For the communication connection in accordance with the BLE, for example, the connection information is acquired by communication between the NFC communication unit 170 of the camera 10 and the NFC communication unit 270 of the terminal 20. Alternatively, a communication connection is established in accordance with the BLE, by using QR code (registered trademark) or manual operation. Once the communication connection in accordance with the BLE is established, the common communication system (e.g., the WLAN, the BLE, or the Bluetooth) and connection information (e.g., service set identifier (SSID), an encryption key, and password) are exchanged between the camera 10 and the terminal 20 and stored in the storage unit 110.

When the camera is powered on, and the processing starts; the control unit 140 determines whether BLE-reconnection history information is present, that is, whether the initial setting is performed in step S101. When it is determined that any BLE-reconnection history information is absent (i.e., NO in S101), the processing ends. When it is determined that any BLE-reconnection history information is present (i.e., YES in S101), based on the information, the control unit 140 reconnects the camera 10 with the terminal 20, in accordance with the BLE wireless communication standard in S103.

In step S104, when the reconnection between the camera 10 and the terminal 20 is successfully established (i.e., YES in S103), the control unit 140 exchanges connection information (i.e., processing system and connection information) between the camera 10 and the terminal 20. Such an exchange of information allows updating of the connection information when the setting is changed. Notably, in one example, the connection information is updated at regular time intervals, and whether the setting is changed on the camera side and the terminal side is determined. Alternatively, when a change in the setting is detected, the control unit 140 reconnects the camera 10 and the terminal 20, and then acquires the connection information.

When the reconnection in accordance with the BLE wireless communication standard fails (NO in step S103), the control unit 140 attempts to connect the camera 10 with the terminal 20 in accordance with the Bluetooth wireless communication standard in step S105. In this case, when the reconnection in accordance with the BLE fails, a given number of attempts to reconnect the camera 10 and the terminal in accordance with the BLE is made. When a connection with the terminal 20 in accordance with the Bluetooth wireless communication standard is established (i.e., YES in S106), the control unit 140 exchanges the connection information regarding the BLE wireless communication standard between the camera 10 and the terminal 20 in step S107. Then, based on the acquired connection information regarding the BLE wireless communication standard, the control unit 140 reconnects the camera 10 with the terminal 20 in accordance with BL in step S106 and step S107. Using the connection information for another wireless communication system to reconnect with the terminal 20 increases the possibility to successfully connect the camera 10 and the terminal 20 in accordance with the BLE wireless communication standard.

When a connection with the terminal 20 in accordance with the Bluetooth wireless communication standard fails (i.e., NO in S106), the control unit 140 reconnects the camera 10 with the terminal 20 in accordance with the WLAN wireless communication standard in step S108. When the reconnection in accordance with the WLAN wireless communication standard is established (i.e., YES in S109), the control unit 140 exchanges the BLE connection information between the camera 10 and the terminal 20, and reconnects the camera 10 with the terminal 20 in accordance with the BLE at step S107. When the reconnection with the terminal 20 in accordance with the BLE fails (i.e., NO in step S109), the control unit 140 locks the camera 10, and performs GPS communication processing in step S112. Alternatively, the control unit 140 performs at least one of these processes: locking the camera and performing the GPS communication processing in step S112. Then, the process ends. The reconnection between the camera 10 and the terminal 12 in accordance with the Bluetooth wireless communication standard or the WLAN wireless communication standard may be attempted a given number of times. Further, multiple types of wireless communication standards are available for the WLAN, and an appropriate communication system is sequentially selected to attempt to reconnect with the terminal 20 until the camera 10 is successfully reconnected with the terminal 20.

When the camera 10 is successfully reconnected with the terminal 20 in accordance with the BLE (i.e., YES in step S110), the control unit 140 interrupts the communication connection with the terminal through the Bluetooth communication unit 150 or the WLAN communication unit 160 in S111. As a result, the communication connection only in accordance with the BLE wireless communication standard is maintained. As the Bluetooth communication unit 150 or the WLAN communication unit 160 consumes a large amount of power because of its communication system, a communication unit that has attempted a communication connection is switched to an energy-saving mode or power-off mode (i.e., power supply is stopped). Even if an attempt to reconnect with the terminal by the Bluetooth or WLAN fails, the energy-saving mode or the power-off mode may be set.

In the processing of FIG. 2, the camera 10 attempts to reconnect with the terminal 20 in accordance with the BLE wireless communication standard when the power is turned on. During the power on, the communication connection might be cut off for some reason. If the communication connection in accordance with the BLE communication standard is cut off in the middle, a communication connection with the terminal 20 in accordance with the Bluetooth or WLAN wireless communication standard is established, and then, a reconnection in accordance with the BLE wireless communication standard is attempted.

However, if the communication connection in accordance with the Bluetooth or WLAN wireless communication standard cannot be achieved after the connection in accordance with the BLE wireless communication standard is cut off; the battery of the terminal 20 may be dead, or the terminal 20 may be out of the communicable range. In view of such circumstances, the control unit 140 renders the camera 10 inoperable in response to any operation on the main body of the camera 10 when the communication connection between the camera 10 and the terminal 20 cannot be achieved through any communication system. This prevents a third party from illegally viewing and acquiring captured image data and thus prevents theft. In one example, the GPS communication unit 180 automatically make a communication connection with the public wireless LAN and transmits the camera position information to the terminal 20 under the control of the control unit 140. This configuration allows a user to immediately find out the location of the camera 10, and also track the camera 10 using its position information if the camera 10 is stolen. Either the process of locking the camera or the GPS communication may be performed.

In the communication connection processing in FIG. 2, the camera 10 is not communicably connected with the terminal 20 when powered off. However, in some examples, the camera 10 remains communicably connected with the terminal 20 even when powered off. In this case, the camera 10 is automatically started up to operate and communicate according to instructions from a user, after the terminal 20 receives a predetermined operation. In another example, the camera 10 is reconnected with the terminal 20 for an update when switched from off to on.

Figure 3:
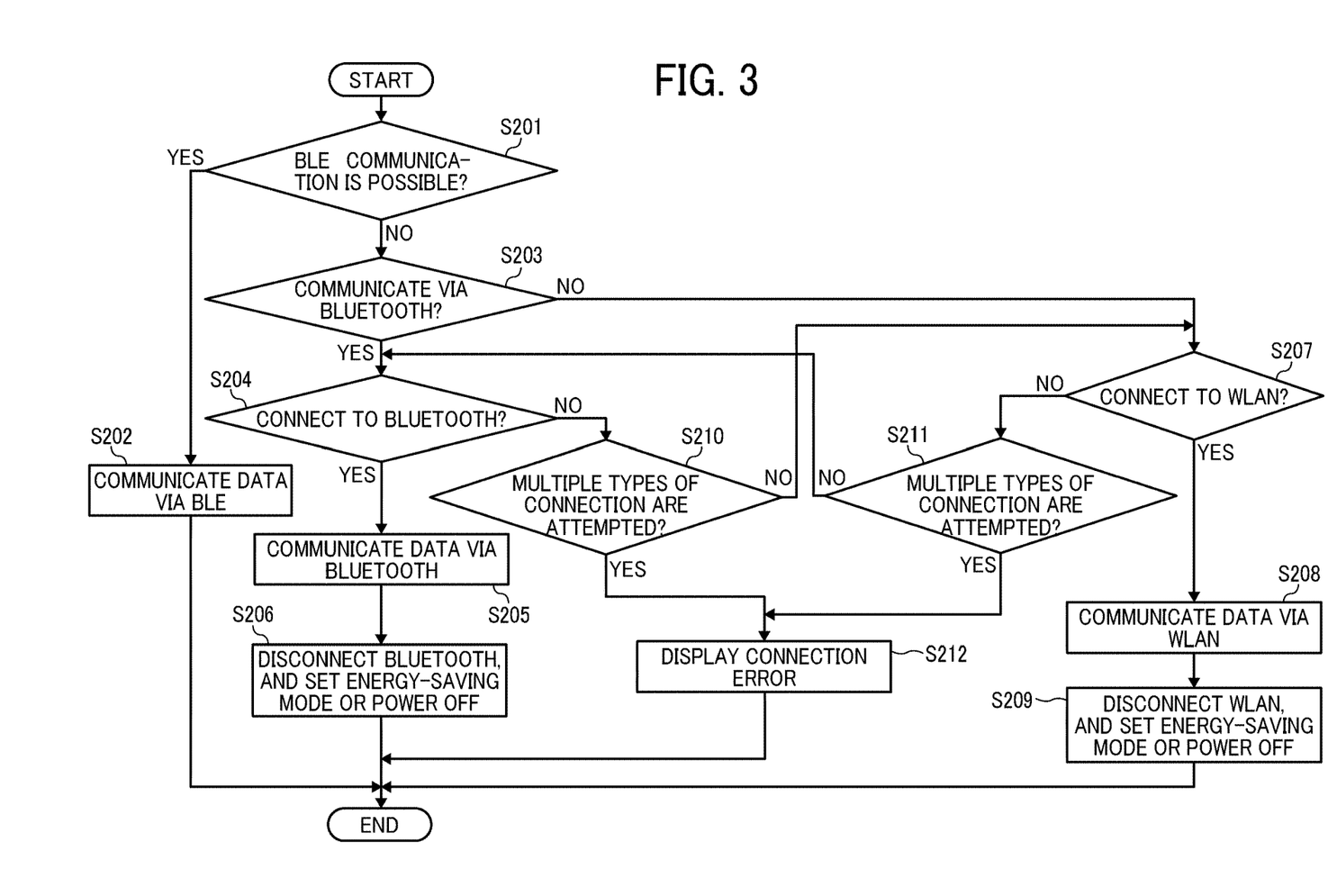
FIG. 3 is a flowchart of communication processing according to an operation input to the camera.

FIG. 3 is a flowchart of communication processing according to an operation input.

The processing starts by operating the main body of the camera 10 or the terminal 20 by a user. The user's operation invokes an operation involving communication processing in accordance with any communication system. The operation includes, for example, causing the camera 10 to capture an image including a moving image by operating the terminal 20, or causing the camera 10 to transmit image data to the terminal 20. Alternatively, such communication processing is performed by timer setting instead of a user's direct operation. Still alternatively, the communication processing automatically starts when the terminal 20 moves to a preset area.

In response to an operation input to the camera 10 or the terminal 20, the control unit 140 determines whether communication processing according to the operation is possible through communication in accordance with the BLE wireless communication standard in S201. In other words, the control unit 140 determines whether communication processing to be performed according to the operation can accept low-speed communication and delay in accordance with the BLE wireless communication standard is determined. For example, a key operation, which is independent of time lag due to the low-speed communication of the BLE, or an operation of communicating data whose capacity is relatively small can be performed through a wireless communication in accordance with the BLE communication standard in step S202.

When an operation, which uses a communication system involving a higher speed communication than a communication speed of the BLE wireless communication standard, is performed, the camera 10 is communicably connected with the terminal 20 in accordance with the Bluetooth or WLAN wireless communication standard. For example, when the camera 10 captures an images according to an operation from the operation of the terminal 20, a high-speed communication as high as the WLAN communication standard is not needed, but in the BLE communication standard, the time lag from an input of the operation to a start of exposure may affect the recorded photograph.

In response to an operation that uses relatively high-speed processing, the Bluetooth wireless communication standard, which allows a higher speed communication than the BLE wireless communication standard, is suitable to perform relatively high-speed communication processing. A communication connection with the terminal 20 is established based on the connection information acquired before an input of an operation, and communication processing in accordance with the Bluetooth wireless communication standard is executed in S203 to S205. An attempt to connect with the terminal 20 may be made a predetermined number of times until the connection is established.

For an operation of transferring still image data or moving image data, the communication processing is performed in accordance with the WLAN wireless communication standard because the data capacity is large. In other words, for an operation accommodated by the communication processing in accordance with the WLAN wireless communication standard, the communication connection with the terminal 20 is established by the WLAN communication unit 160 in S207, and the communication processing is executed in accordance with the WLAN wireless communication standard in S208. An attempt to connect with the terminal 20 may be made a predetermined number of times until the connection is established.

Such a communication system to be performed according to an operation input is selected by a user in advance on the terminal 20 side or the camera 10 side. Alternatively, the communication system is automatically set in advance in the camera 10. In either case, an appropriate communication system is determined according to the operation in consideration of the communication speed and delay.

For communication processing at WLAN 2.4 GHz for example, the connection might fail because the frequency bandwidth partially overlaps with a frequency band used in home appliances and cordless telephones. In such a case where a connection with the terminal 20 using the high-speed communication system fails, the communication standard is switched to WLAN 5 GHz or Bluetooth wireless communication standard in step S210 and step S211. In such a manner, the communication system is sequentially switched to another communication system among the high-speed communication standards, and thus desired communication processing is achieved in accordance with any high-speed communication system.

During the communication processing in accordance with the Bluetooth or WLAN wireless communication standard, the camera 10 remains communicably connected with the terminal 20 in accordance with the BLE wireless communication standard. This prevents the failure of reconnection with the terminal 20 in accordance with the BLE wireless communication standard, or allows less time for reconnection. Notably, when an operation that involves a series of communication processes is not performed, the communication connection in accordance with the BLE wireless communication standard may be cut off during the communication processing in accordance with the Bluetooth or WLAN wireless communication standard.

When the communication processing in accordance with the Bluetooth or WLAN wireless communication standard is completed, the communication connection with the terminal 20 in accordance with the Bluetooth or WLAN wireless communication standard is cut off. Further, the energy saving mode is set, and the power is turned off in S206 and S209.

When the communication connection in accordance with the Bluetooth and WLAN wireless communication standards fail, a connection error is displayed in S212. Notably, the connection information may be acquired again from the terminal 20 by communication in accordance with the BLE wireless communication standard, and the communication connection in accordance with the Bluetooth or WLAN wireless communication standard may be attempted again.

If communication is interrupted during the communication processing in accordance with a wireless communication standard such as Bluetooth, or if the communication speed becomes significantly slower than expected and fails to meet specified conditions, the control unit 140 selects another communication system with a higher or lower communication speed to perform communication processing in accordance with the selected communication system. This is effective when communication interruption occurs in communication processing such as WLAN 2.4 GHz.

The configuration of the camera 10 and the communication processing for communicably connecting the camera 10 with the terminal 20 according to the present embodiments eliminate the need for a user's cumbersome work, and allow an appropriate communication system to be seamlessly selected to perform desired communication processing without a user's operation other than an operation for capturing an image or transferring image data on the terminal side or the camera side. Further, a communication system can be switched between the BLE wireless communication standard, which consumes low power, higher-speed Bluetooth communication system, WLAN 2.4 GHz, and WLAN 5 GHz.

In some examples, another communication system other than the above-described communication systems is used for the communication processing. In such a case, a low-power communication device (e.g., the Bluetooth communication unit 150) maintains communication through a low-power communication system that consumes a relatively low power, and the control unit 140 switches to a high-communication device (e.g., the WLAN communication unit 160) to communicate through a high-speed communication system in response to an input of an operation that uses a higher-speed communication system. Such high-speed processing is used or preferable for a camera operation including a release operation and an image-capturing operation followed by the release operation from the terminal, and operations for transmitting image data from the camera side to the terminal side, and transmitting an image to be displayed on the monitor. Further, a higher-speed communication system is used depending on the operation requested by a user. Such communication systems can be set by the user as an option or may be set by default in advance. The camera 10 is not limited to a digital camera, and may be any image-capturing device that includes an image-capturing capacity. The terminal 20 is not limited to a mobile terminal such as smartphone.

In one aspect of the present disclosure, an image-capturing device includes a low-power communication device that consumes lower power than at least one high-speed communication device; the at least one high-speed communication device communicable at a higher speed than the low-power communication device; and circuitry. The low-power communication device is configured to perform first communication processing. The at least one high-speed communication device is configured to perform second communication processing. The circuitry configured to: switch between the low-power communication device and the at least one high-speed communication device according to an operation input to the image-capturing device or an external terminal communicably connectable with the image-capturing device, to perform processing including the first communication processing or the second communication processing according to the operation, the operation including a first operation, for which the first communication processing is acceptable, or a second operation that involves the second communication processing. The circuitry is configured to: in response to an input of the first operation, control the low-power communication device to perform the first communication processing based on a connection state of the low-power communication device and the external terminal, which has been established before the input of the first operation; and in response to an input of the second operation, control the at least one high-speed communication device to connect with the external terminal and perform the second communication processing based on connection information acquired before the input of the second operation.

In the image-capturing device according to a second aspect of the present disclosure, the circuitry is further configured to control the low-power communication device to maintain connected with the external terminal during power off of the image-capturing device and during the second communication processing.

In the image-capturing device according to a third aspect of the present disclosure, the circuitry is further configured to, in response to disconnection of the external terminal and the low-power communication device, or in response to failure to reconnect with the external terminal by the low-power communication device: control the at least one high-speed communication device to connect with the external terminal; and acquire information regarding connection of the low-power communication device with the external terminal; and control the low-power communication device to reconnect with the external terminal.

In the image-capturing device according to a fourth aspect of the present disclosure, the circuitry is further configured to, in response to power-on of the image-capturing device, control the low-power communication device to connect with the external terminal based on information regarding connection history stored in a memory.

In the image-capturing device according to a fifth aspect of the present disclosure, the at least one high-speed communication device is configured to perform the second communication processing according to one selected from the group consisting of two or more communication systems. Further, the circuitry is further configured to: select one communication system from a communication system corresponding to the low-power communication device and the two or more communication systems corresponding to the at least one high-speed communication device; determine whether a communication speed based on the selected one communication system satisfies a condition; and in response to a determination that the communication speed based on the selected one communication system fails to satisfy the condition, switch from the selected one communication system to another communication system among the communication system corresponding to the low-power communication device and the two or more communication systems corresponding to the at least one high-speed communication device.

In the image-capturing device according to a sixth aspect of the present disclosure, the at least one high-speed communication device is configured to perform the second communication processing according to one selected from the group consisting of two or more communication systems. The circuitry is further configured to, in response to failure to connect with the external terminal according to any one of the communication system corresponding to the low-power communication device and the two or more communication systems corresponding to the at least one high-speed communication device, sequentially switch to another communication system among the communication system corresponding to the low-power communication device and the two or more communication systems corresponding to the at least one high-speed communication device to connect with the external terminal.

In the image-capturing device according to a seventh aspect of the present disclosure, the circuitry is further configured to, in response to failure to connect with the external terminal by any one of the low-power communication device and the at least one high-speed communication device, render the image-capturing device inoperable in response to any operation input to the image-capturing device.

The image-capturing device according to an eighth aspect of the present disclosure further includes a position information communication device configured to acquire position information of the image-capturing device. The circuitry is further configured to, in response to failure to connect with the external terminal by any one of the low-power communication device and the at least one high-speed communication device, control the position information communication device to connect with the external terminal through a public wireless local area network (LAN) and transmit the acquired position information to the external terminal.

In a ninth aspect of the present disclosure, a communication method includes switching between a low-power communication device and at least one high-speed communication device according to an operation input to an image-capturing device or an external terminal communicably connectable with the image-capturing device, to perform processing according to the operation, the low-power communication device configured to perform first communication processing and consume lower power than the at least one high-speed communication device, the at least one high-speed communication device configured to perform second communication processing and communicable at a higher speed than the low-power communication device, the processing including the first communication processing or the second communication processing, the operation including a first operation, for which the first communication processing is acceptable, or a second operation that involves the second communication processing. The communication method further includes: in response to an input of the first operation, controlling the low-power communication device to perform the first communication processing based on a connection state of the low-power communication device and the external terminal, which has been established before the input of the first operation; and in response to an input of the second operation, controlling the at least one high-speed communication device to connect with the external terminal and perform the second communication processing based on connection information acquired before the input of the second operation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image-capturing device comprising:
a low-power communication device that consumes lower power than at least one high-speed communication device, the low-power communication device configured to perform first communication processing;
the at least one high-speed communication device communicable at a higher speed than the low-power communication device, the at least one high-speed communication device configured to perform second communication processing; and
circuitry configured to:
switch between the low-power communication device and the at least one high-speed communication device according to an operation input to the image-capturing device or an external terminal communicably connectable with the image-capturing device, to perform processing including the first communication processing or the second communication processing according to the operation input, the operation input including a first operation, for which the first communication processing is acceptable, or a second operation that involves the second communication processing,
wherein the circuitry is configured to:
in response to an input of the first operation, control the low-power communication device to perform the first communication processing based on a connection state of the low-power communication device and the external terminal, which has been established before the input of the first operation;
in response to an input of the second operation, control the at least one high-speed communication device to connect with the external terminal and perform the second communication processing based on connection information acquired before the input of the second operation; and
control the low-power communication device to maintain connected with the external terminal during power off of the image-capturing device and during the second communication processing.

2. The image-capturing device according to claim 1, wherein the circuitry is further configured to, in response to disconnection of the external terminal and the low-power communication device, or in response to failure to reconnect with the external terminal by the low-power communication device:
control the at least one high-speed communication device to connect with the external terminal; and
acquire information regarding connection of the low-power communication device with the external terminal; and
control the low-power communication device to reconnect with the external terminal.

3. The image-capturing device according to claim 1, wherein the circuitry is further configured to, in response to power-on of the image-capturing device, control the low-power communication device to connect with the external terminal based on information regarding connection history stored in a memory.

4. The image-capturing device according to claim 1, wherein the at least one high-speed communication device is configured to perform the second communication processing according to one selected from the group consisting of two or more communication systems, and
wherein the circuitry is further configured to:
select one communication system from a communication system corresponding to the low-power communication device and the two or more communication systems corresponding to the at least one high-speed communication device;
determine whether a communication speed based on the selected one communication system satisfies a condition; and
in response to a determination that the communication speed based on the selected one communication system fails to satisfy the condition, switch from the selected one communication system to another communication system among the communication system corresponding to the low-power communication device and the two or more communication systems corresponding to the at least one high-speed communication device.

5. The image-capturing device according to claim 1, wherein the at least one high-speed communication device is configured to perform the second communication processing according to one selected from the group consisting of two or more communication systems, and
wherein the circuitry is further configured to, in response to failure to connect with the external terminal according to any one of the communication system corresponding to the low-power communication device and the two or more communication systems corresponding to the at least one high-speed communication device, sequentially switch to another communication system among the communication system corresponding to the low-power communication device and the two or more communication systems corresponding to the at least one high-speed communication device to connect with the external terminal.

6. The image-capturing device according to claim 1, wherein the circuitry is further configured to, in response to failure to connect with the external terminal by any one of the low-power communication device and the at least one high-speed communication device, render the image-capturing device inoperable in response to any operation input to the image-capturing device.

7. The image-capturing device according to claim 1, further comprising a position information communication device configured to acquire position information of the image-capturing device,
wherein the circuitry is further configured to, in response to failure to connect with the external terminal by any one of the low-power communication device and the at least one high-speed communication device, control the position information communication device to connect with the external terminal through a public wireless local area network (LAN) and transmit the acquired position information to the external terminal.

8. A communication method comprising:
switching between a low-power communication device and at least one high-speed communication device according to an operation input to an image-capturing device or an external terminal communicably connectable with the image-capturing device, to perform processing according to the operation input, the low-power communication device configured to perform first communication processing and consume lower power than the at least one high-speed communication device, the at least one high-speed communication device configured to perform second communication processing and communicable at a higher speed than the low-power communication device, the processing including the first communication processing or the second communication processing, the operation input including a first operation, for which the first communication processing is acceptable, or a second operation that involves the second communication processing,
wherein the communication method further includes:
in response to an input of the first operation, controlling the low-power communication device to perform the first communication processing based on a connection state of the low-power communication device and the external terminal, which has been established before the input of the first operation;
in response to an input of the second operation, controlling the at least one high-speed communication device to connect with the external terminal and perform the second communication processing based on connection information acquired before the input of the second operation; and
controlling the low-power communication device to maintain connected with the external terminal during power off of the image-capturing device and during the second communication processing.

* * * * *